(12) United States Patent
Fujita

(10) Patent No.: US 8,879,981 B2
(45) Date of Patent: Nov. 4, 2014

(54) COMMUNICATION APPARATUS, COMMUNICATION RELAY APPARATUS, AND CONTROL METHOD THEREOF

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 12/938,859

(22) Filed: Nov. 3, 2010

(65) Prior Publication Data

US 2011/0117844 A1   May 19, 2011

(30) Foreign Application Priority Data

Nov. 19, 2009  (JP) ................................ 2009-264187

(51) Int. Cl.
| | | |
|---|---|---|
| H04B 7/15 | (2006.01) | |
| H04B 7/155 | (2006.01) | |
| H04W 76/02 | (2009.01) | |
| H04W 48/08 | (2009.01) | |
| H04W 88/04 | (2009.01) | |
| H04W 24/00 | (2009.01) | |
| H04W 76/06 | (2009.01) | |

(52) U.S. Cl.
   CPC .............. *H04B 7/155* (2013.01); *H04W 76/02* (2013.01); *H04W 48/08* (2013.01); *H04W 88/04* (2013.01); *H04W 24/00* (2013.01); *H04W 76/06* (2013.01)
   USPC ............ 455/11.1; 455/7; 455/41.1; 455/41.2; 455/41.3

(58) Field of Classification Search
   CPC .............................. H04W 4/008; H04W 8/008
   USPC ................ 455/7, 41.1–41.3, 9, 11.1
   See application file for complete search history.

(56) References Cited

U.S. PATENT DOCUMENTS

| | | | |
|---|---|---|---|
| 7,880,639 B2 * | 2/2011 | Courtney et al. ............. 340/12.5 |
| 2002/0115426 A1* | 8/2002 | Olson et al. .................. 455/410 |
| 2007/0135038 A1* | 6/2007 | Peele ................................. 455/7 |
| 2009/0156123 A1* | 6/2009 | Kim ............................ 455/41.2 |
| 2009/0163141 A1* | 6/2009 | Chae ........................... 455/41.3 |

FOREIGN PATENT DOCUMENTS

| | | |
|---|---|---|
| JP | 2003-309694 A | 10/2003 |
| JP | 2006-031531 | 2/2006 |

OTHER PUBLICATIONS

Jul. 22, 2013 Japanese Office Action, that issued in Japanese Patent Application No. 2009-264187.

* cited by examiner

*Primary Examiner* — Ping Hsieh
*Assistant Examiner* — Angelica M Perez
(74) *Attorney, Agent, or Firm* — Cowan, Liebowitz & Latman, P.C.

(57) ABSTRACT

A communication relay apparatus transmits a list of external apparatuses connected to itself to a communication apparatus, and closes the first close proximity wireless communication. After the user designates one apparatus used to make a data communication from the list of external apparatuses in the communication apparatus, when the communication apparatus and communication relay apparatus are connected again in the close proximity wireless communication mode, the communication relay apparatus establishes a communication path between the communication apparatus and the external apparatus used to make the data communication. Then, when a communication is to be made with one of a plurality of external apparatuses connected to the communication relay apparatus via the communication relay apparatus, the communication partner apparatus can be easily selected.

8 Claims, 12 Drawing Sheets

F I G. 4

| No. | APPARATUS NAME | I/F | UNIQUE ID | EXECUTABLE APPLICATION |
|---|---|---|---|---|
| 1 | SERVER | COMMUNICATION UNIT | abcd | UPLOAD, DOWNLOAD |
| 2 | PC | COMMUNICATION UNIT | efgh | UPLOAD, DOWNLOAD, STREAMING PLAYBACK |
| 3 | DTV | COMMUNICATION UNIT | ijkl | STREAMING PLAYBACK |
| 4 | PRINTER | COMMUNICATION UNIT | mnop | PRINT |
| 5 | DIGITAL VIDEO CAMERA | SECOND CLOSE PROXIMITY COMMUNICATION UNIT | qrst | UPLOAD, DOWNLOAD |
| 6 | DIGITAL CAMERA | FIRST CLOSE PROXIMITY COMMUNICATION UNIT | uvwx | UPLOAD, DOWNLOAD |

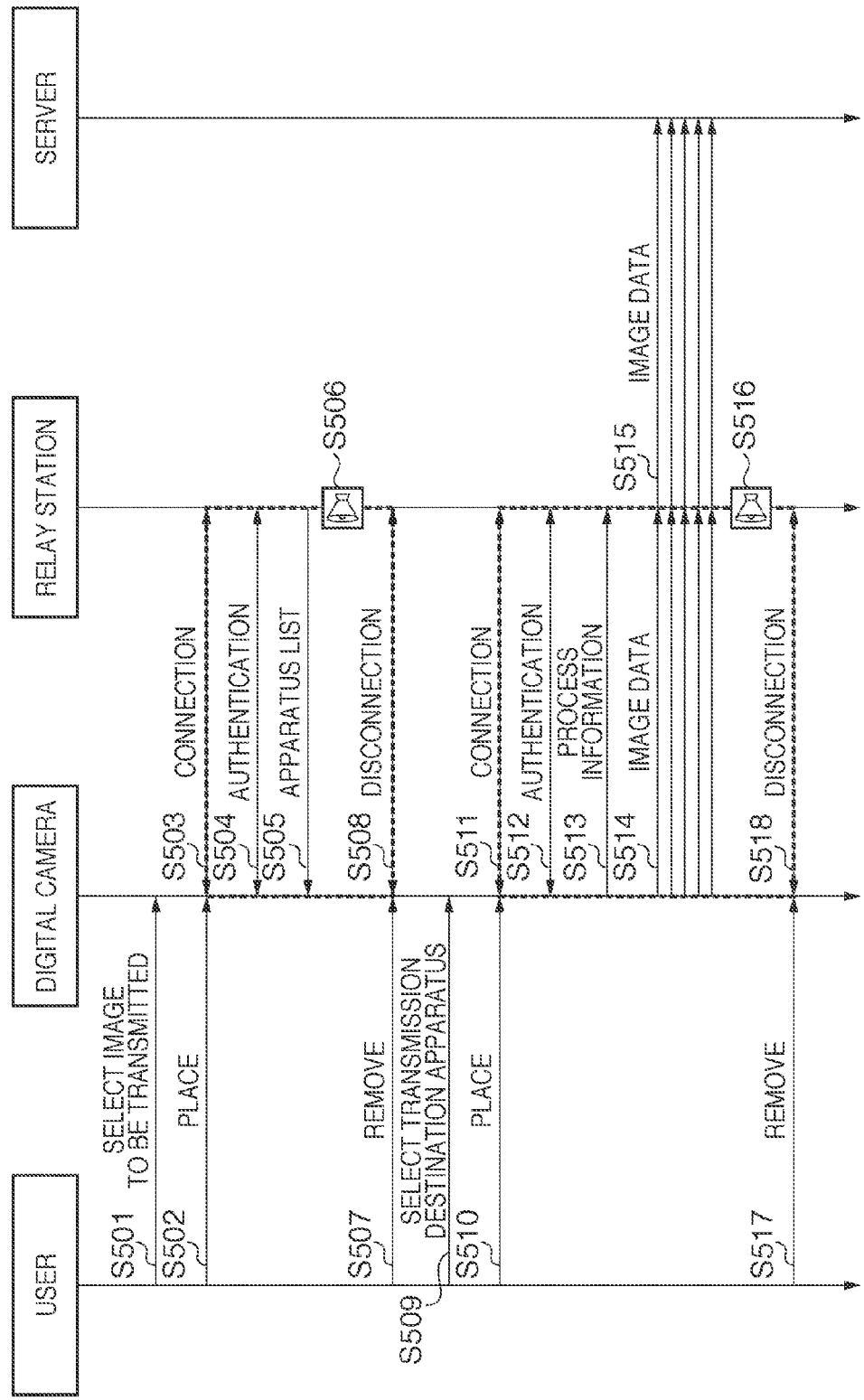

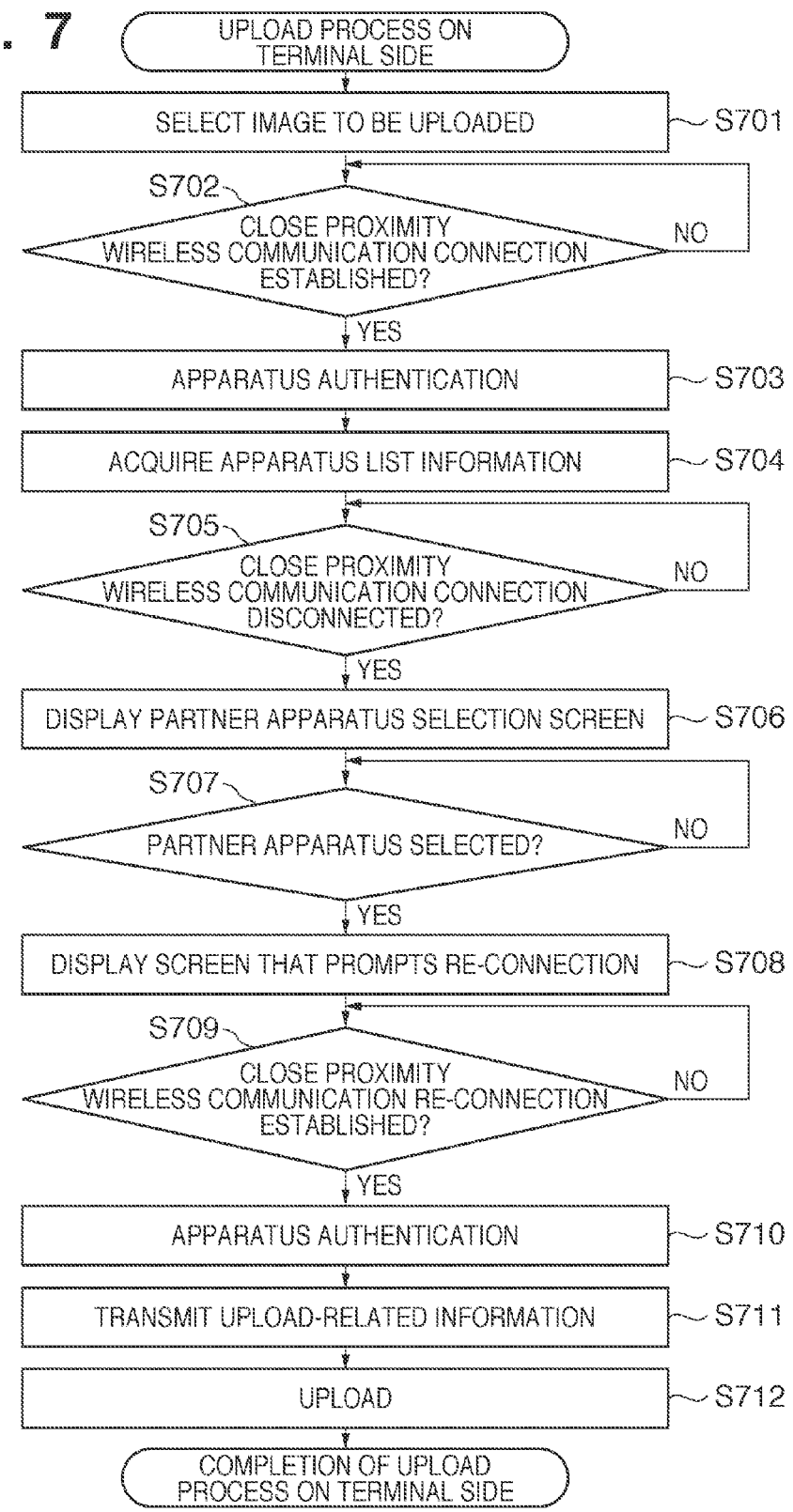

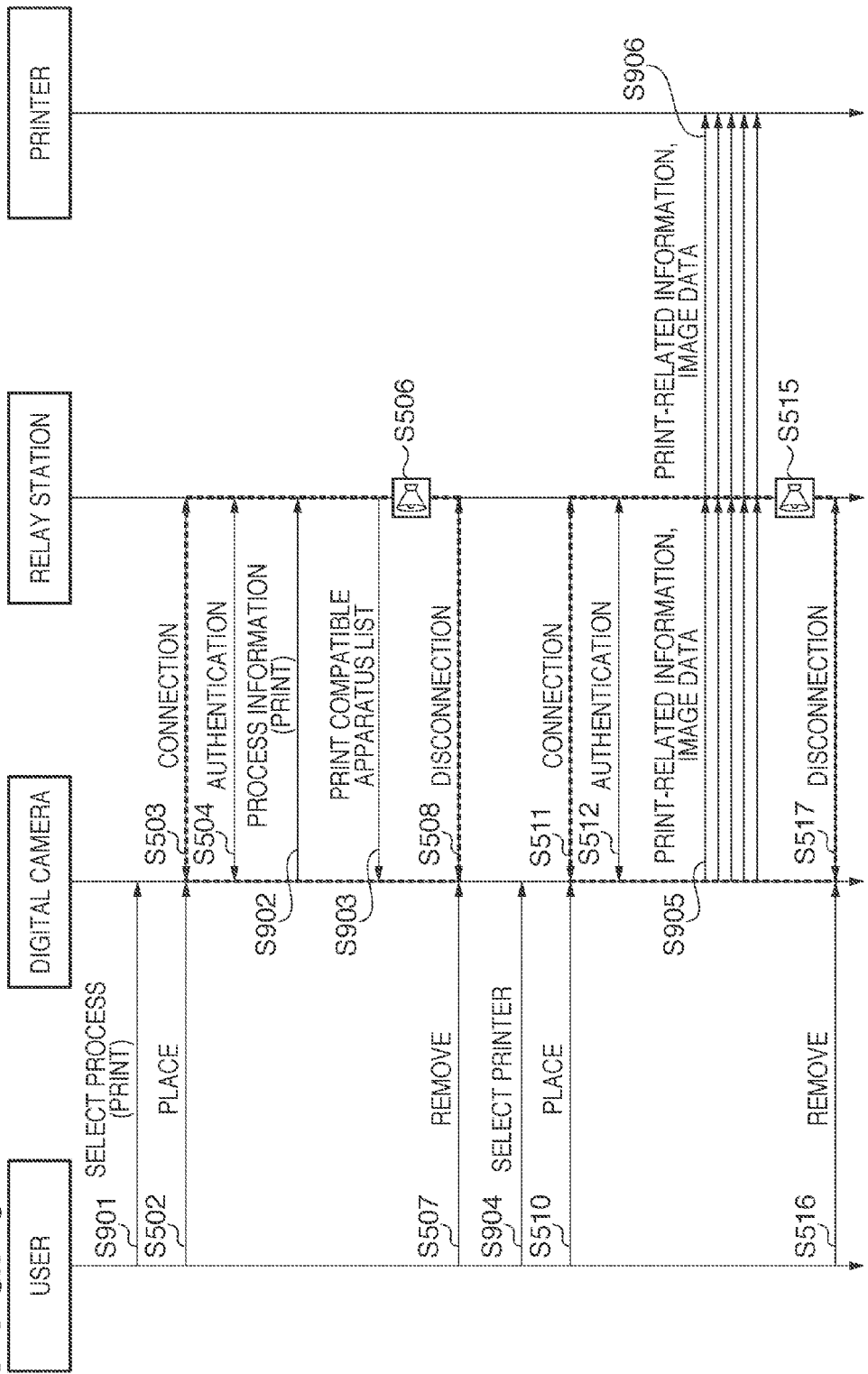

US 8,879,981 B2

COMMUNICATION APPARATUS, COMMUNICATION RELAY APPARATUS, AND CONTROL METHOD THEREOF

BACKGROUND OF THE INVENTION

1. Field of the Invention

The present invention relates to a communication apparatus which makes a data communication with an external apparatus connected to a communication relay apparatus via a close proximity wireless communication, and a communication relay apparatus.

2. Description of the Related Art

Some information apparatuses such as terminal devices (for example, personal computers) and image capturing apparatuses (for example, digital still cameras) execute data transmission/reception using wireless communications. A close proximity wireless communication which uses an NFC (Near Field Communication) technique that uses an IC tag in a wireless communication between information apparatuses has been used in broader fields due to excellent portability in addition to information apparatuses. Japanese Patent Laid-Open No. 2006-31531 discloses an information acquisition/distribution system in which a reader/writer of an IC tag of a close proximity wireless communication is arranged in an advertising medium to execute data transmission/reception.

The information acquisition/distribution system of Japanese Patent Laid-Open No. 2006-31531 transmits/receives data using a one-to-one close proximity wireless communication. For example, when there is a plurality of advertising media, the user has to bring his or her information apparatus closer to one target advertising medium upon receiving information. That is, the user decides a communication target of the close proximity wireless communication by bringing the information apparatus closer to that communication target.

By contrast, the following arrangement may be adopted. That is, for example, a reader/writer for a close proximity wireless communication is arranged in a communication relay apparatus such as a network hub, and the user communicates with a plurality of external apparatuses connected to this communication relay apparatus by bringing his or her information apparatus closer to the communication relay apparatus. In this case, the user can communicate with the plurality of external apparatuses by bringing his or her information apparatus closer to the communication relay apparatus. However, in such conventional system, there is no means for selecting one external apparatus as a communication partner with which the information apparatus is to make a communication.

SUMMARY OF THE INVENTION

The present invention has been made in consideration of the aforementioned problems of the related arts. The present invention provides a communication apparatus which allows to easily selecting a communication partner apparatus to communicate with when a communication is to be made with a plurality of external apparatuses connected to a communication relay apparatus via this communication relay apparatus.

The present invention in its first aspect provides a communication apparatus which comprises a close proximity communication unit which makes a close proximity wireless communication with a communication relay apparatus, and makes a data communication with one of a plurality of external apparatuses connected to the communication relay apparatus using the close proximity communication unit via the communication relay apparatus, the communication apparatus comprising: a detection unit which detects a connection with the communication relay apparatus by the close proximity communication unit; an acquisition unit which acquires a list of the external apparatuses from the communication relay apparatus; a target designating unit which prompts a user to designate one external apparatus used to make the data communication from the list of the external apparatuses acquired by the acquisition unit; and a transmission unit which transmits at least information of the one external apparatus designated by the target designating unit to the communication relay apparatus, wherein the acquisition unit acquires the list of the external apparatuses when the detection unit detects the first connection between the communication apparatus and the communication relay apparatus by the close proximity communication unit, and the transmission unit transmits the information of the one external apparatus designated by the user via the target designating unit to the communication relay apparatus when the detection unit detects the next connection between the communication apparatus and the communication relay apparatus by the close proximity communication unit.

Further features of the present invention will become apparent from the following description of exemplary embodiments (with reference to the attached drawings).

BRIEF DESCRIPTION OF THE DRAWINGS

FIG. 4 is a table for explaining a configuration example of an external apparatus list;

FIG. 5 is a sequence flowchart for explaining an upload process according to the embodiment;

FIG. 7 is a flowchart for explaining an upload process on the terminal side according to the embodiment;

FIG. 9 is a sequence flowchart for explaining a print process according to a modification;

DESCRIPTION OF THE EMBODIMENTS

A preferred embodiment of the present invention will be described in detail hereinafter with reference to the drawings. As an embodiment to be described below, an example in which the present invention is applied to a digital camera which can make a data communication using a close proximity wireless communication as an example of a communication apparatus, and a relay station which can make a data communication using a close proximity wireless communication as an example of a communication relay apparatus will be explained. Assume that the relay station of this embodiment establishes connections (externally communicates) with a plurality of external apparatuses in wired and wireless communication modes, and can relay a data communication made using the close proximity wireless communication to the connected external apparatuses.

Figure 1:
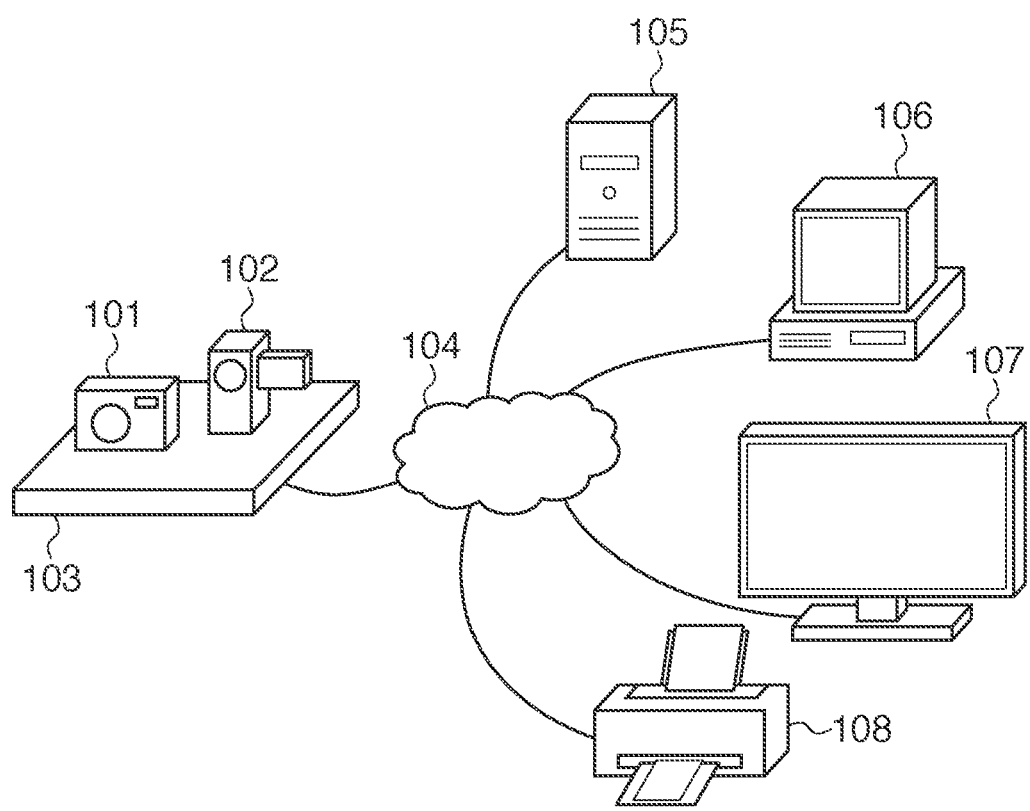
FIG. 1 is a diagram showing the system configuration according to an embodiment.

FIG. 1 is a diagram showing the system configuration including a digital camera and relay station according to the embodiment of the present invention.

A relay station 103 includes a network interface, is connected to a server 105, PC 106, digital television (DTV) 107, and printer 108 via a network 104, and can communicate with these apparatuses with each other. In this embodiment, the network 104 assumes that based on an Internet protocol, and the respective connected apparatuses have an automatic detection function of automatically detecting other apparatuses on the network. Also, in the following description, assume that the respective apparatuses connected to the network 104 have an automatic capability acquisition function of automatically acquiring services (capabilities) of other apparatuses on the network. These automatic detection function and automatic capability acquisition function are used in the DLNA (Digital Living Network Alliance) standard used to implement a home network. In the following description, in this embodiment, assume that the server 105, PC 106, DTV 107, and printer 108 are compliant with the DLNA standard. However, the automatic detection function and automatic capability acquisition function are not limited to the DLNA standard. For example, these functions can also be implemented in such a manner that an outgoing signal which is to be transmitted from each apparatus so as to detect respective apparatuses includes service information of itself.

The relay station 103 includes two close proximity wireless communication interfaces, and a digital camera 101 and digital video camera 102 are connected to the relay station 103 in a close proximity wireless communication mode. The close proximity wireless communication is a wireless communication based on a communication protocol which is specified under the assumption that the communication distance is less than 1 m and, more particularly, it is less than several 10 cm, and non-contact communication protocols of "vicinity type" having a communication distance of about 70 cm or less and "close proximity type" having that of about 10 cm or less are known.

Figure 2:
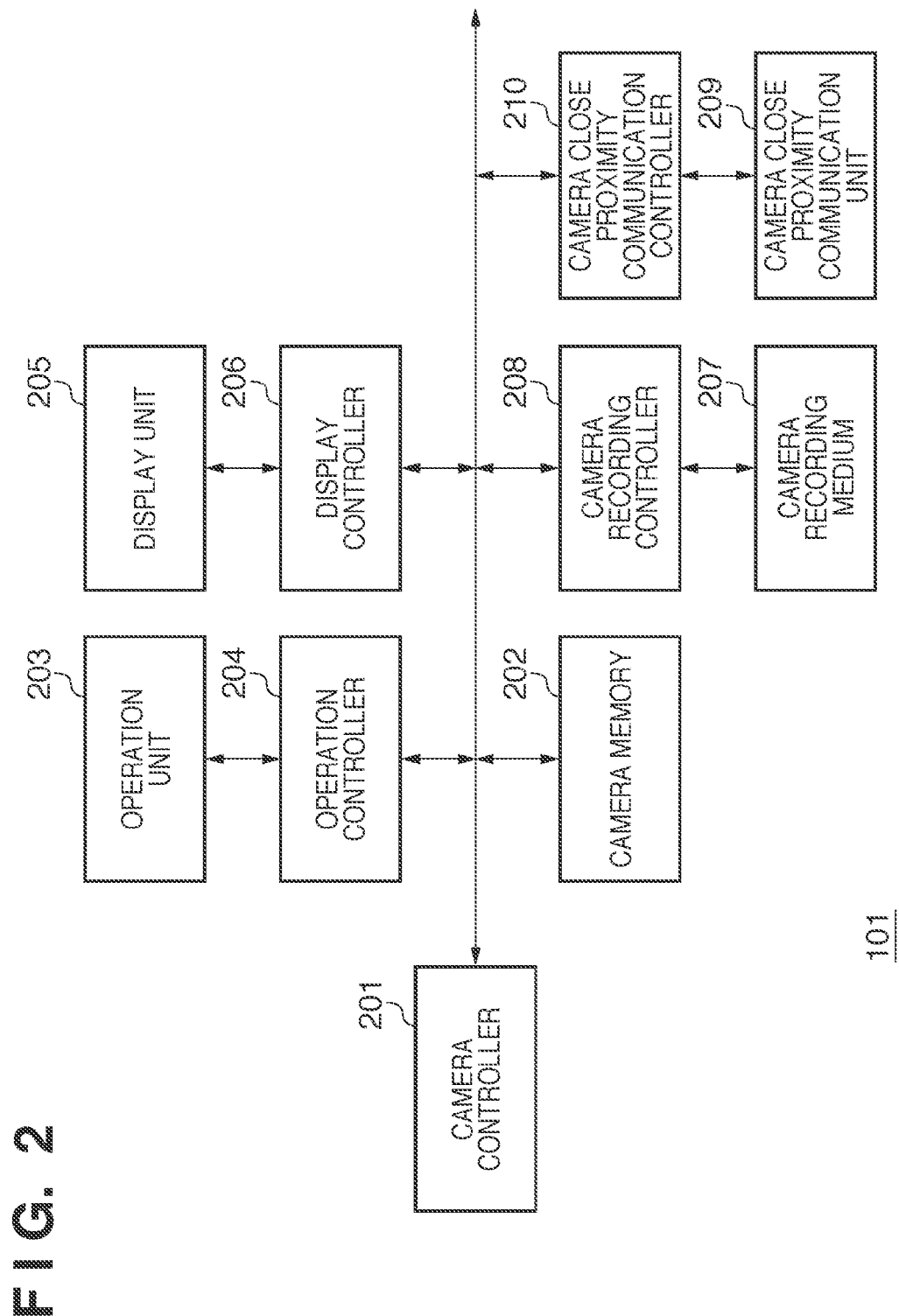
FIG. 2 is a block diagram showing the functional arrangement of a digital camera according to the embodiment.

FIG. 2 is a block diagram showing the functional arrangement of the digital camera according to the embodiment of the present invention. In this embodiment, since the digital camera 101 is an example of a communication apparatus, it will be described below while FIG. 2 shows only components required for the communication apparatus, and does not show any characteristic blocks of an image capturing apparatus (for example, an image capture unit).

A camera controller 201 is, for example, a CPU, and controls the operations of respective blocks included in the digital camera 101. More specifically, the camera controller 201 reads out operation programs of the respective blocks of the digital camera 101, which are stored in a camera memory 202 (to be described below), and executes these operation programs mapped on a RAM (not shown), thereby controlling the respective blocks of the digital camera 101. The camera memory 202 is a rewritable nonvolatile memory, and stores, for example, operation screen GUI data to be displayed on a display unit 205 (to be described later) in addition to the operation programs of the respective blocks included in the digital camera 101. Also, the camera memory 202 is used as storage areas of various data such as a storage area of an apparatus information list of external apparatuses on the network 104, as will be described later.

An operation unit 203 includes, for example, buttons, arrow keys, a dial, and a touch panel, and serves as an input user interface included in the digital camera 101. The operation unit 203 transfers information input by a user operation to an operation controller 204. The operation controller 204 discriminates a request input by the user from the information input by operating the operation unit 203, and informs the camera controller 201 of the discriminated request. For example, when the user operates a release button (not shown), the operation controller 204 determines that an image capture request is input, and transfers a request detail to the camera controller 201.

The display unit 205 is a display device such as a compact LCD, and displays image data and movie data captured by the digital camera 101 or a GUI such as a menu screen used to present information to the user. A display controller 206 is a block which controls information to be displayed on the display unit 205, and outputs information input from the camera controller 201 to itself to the display unit 205. More specifically, the display controller 206 outputs, for example, a GUI stored in the camera memory 202 or image data recorded in a camera recording medium 207 (to be described below), which is input from the camera controller 201, to the display unit 205, and controls the display unit 205 to display such information.

The camera recording medium 207 includes recording devices such as a built-in memory included in the digital camera 101, and an HDD or memory card detachably connected to the digital camera 101, and records, for example, image data captured by the digital camera 101. A camera recording controller 208 manages information such as the connection state of the camera recording medium 207 and the total size of recorded data, and controls data read and write accesses from and to the camera recording medium 207.

A camera close proximity communication unit 209 is an interface for a close proximity wireless communication, and can establish a close proximity wireless communication connection with an apparatus that can make a close proximity wireless communication (to be referred to as a close proximity communication apparatus hereinafter) when such apparatus is detected within a communication range. In this embodiment, when the digital camera 101 is brought closer to the relay station 103, the camera close proximity communication unit 209 makes a close proximity wireless communication with a first close proximity communication unit 309 (to be described later) included in the relay station 103. A camera close proximity communication controller 210 has a function of detecting a connection and disconnection of a close proximity wireless communication with a close proximity communication apparatus located within a communication range. When a connection with a close proximity communication apparatus located within a communication range is established, or when the connection is disconnected, the camera close proximity communication controller 210 which informs the camera controller 201 of the establishing connection event or disconnection event. The camera close proximity communication controller 210 which transmits the data stored in the camera memory 202 or camera recording medium 207 to the close proximity communication apparatus located within the communication range via the camera close proximity communication unit 209, in response to an instruction from the camera controller 201. The camera close proximity communication controller 210 stores data received from the close proximity communication apparatus located within the communication range via the camera close proximity communication unit 209 in the camera memory 202 or camera recording medium 207.

Figure 3:
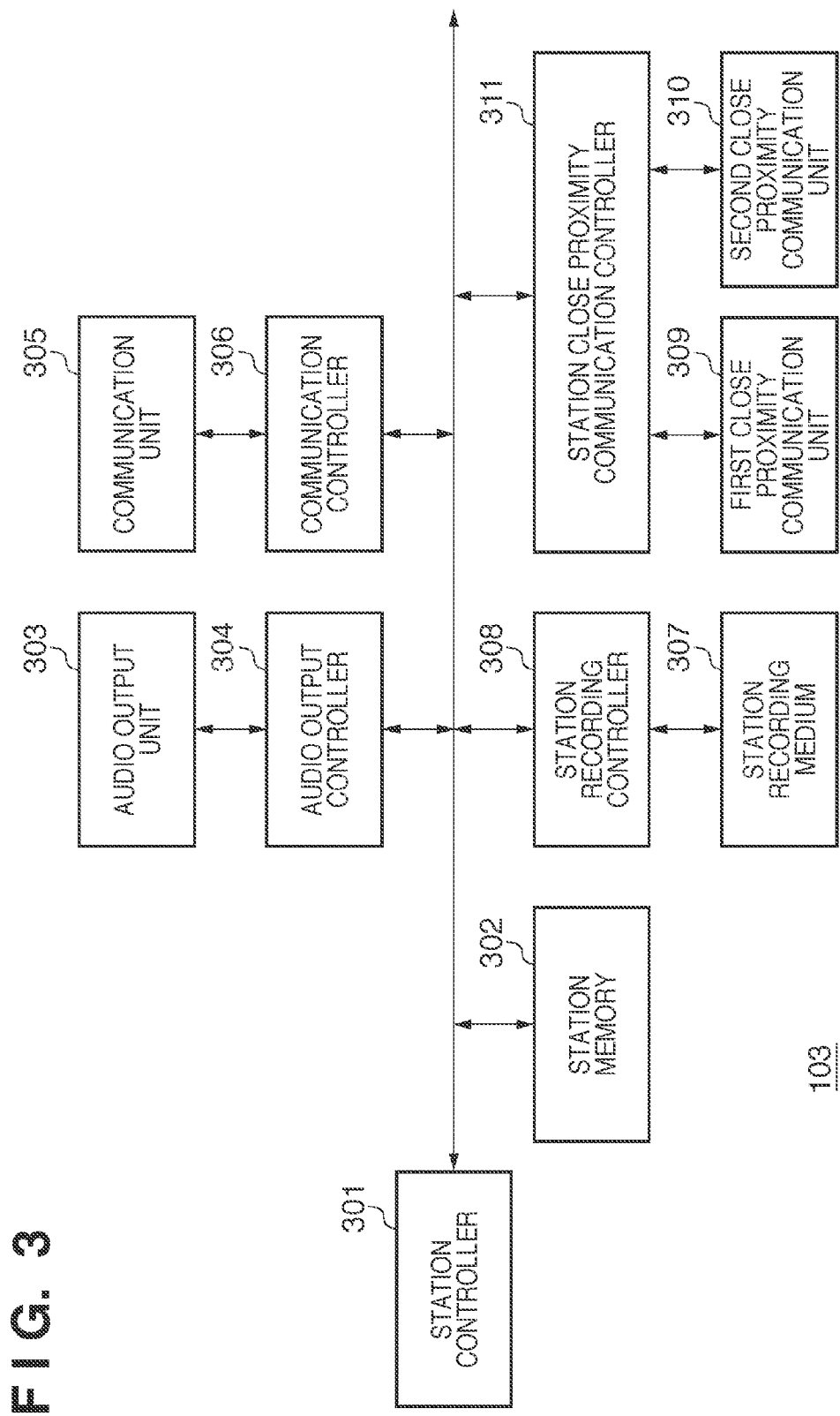
FIG. 3 is a block diagram showing the functional arrangement of a relay station.

FIG. 3 is a block diagram showing the functional arrangement of the relay station according to the embodiment of the present invention.

A station controller 301 is, for example, a CPU, and controls the operations of respective blocks included in the relay station 103. More specifically, the station controller 301 reads out operation programs of the respective blocks in the relay station 103, which are stored in a station memory 302 (to be described below), and executes the operation programs mapped on a RAM (not shown), thereby controlling the operations of the respective blocks. The station memory 302 is a rewritable nonvolatile memory, and stores, for example, audio data to be output from an audio output unit 303 (to be described later) in addition to the operation programs of the respective blocks included in the relay station 103. Also, the station memory 302 is used as storage areas of various data such as that of an apparatus information list of external apparatuses (to be described later) on the network 104.

The audio output unit 303 is an audio output interface such as a loudspeaker included in the relay station 103, and can notify the user of an audible message by outputting audio data. For example, when a close proximity wireless communication of the first close proximity communication unit 309 or a second close proximity communication unit 310 (to be described later) is complete, the audio output unit 303 outputs audio data indicating that the communication is complete. Then, the relay station 103 can notify the user that he or she can remove the digital camera 101 or digital video camera 102 from the relay station 103. An audio output controller 304 transfers audio data stored in the station memory 302 to the audio output unit 303 and controls the audio output unit 303 to output the audio data in response to an instruction from the station controller 301.

A communication unit 305 is a network connection interface included in the relay station 103. The relay station 103 is connected to the network via the communication unit 305, and can communicate with external apparatuses on the network 104. The communication unit 305 is, for example, an Ethernet port or a wireless LAN port compliant with the IEEE802.11 standard, and is connected to the network 104 and external apparatuses on the network 104 in a wired or wireless communication mode. A communication controller 306 transmits data stored in the station memory 302 or a station recording medium 307 (to be described later) to external apparatuses via the communication unit 305 in response to an instruction from the station controller 301. Also, the communication controller 306 stores data received from the external apparatuses on the network via the communication unit 305 in the station memory 302 or station recording medium 307.

The station recording medium 307 includes recording devices such as a built-in flash memory included in the relay station 103, and an HDD or memory card detachably connected to the relay station 103. The station recording medium 307 records data received by the relay station 103 via, for example, a close proximity wireless communication or network communication. A station recording controller 308 records data received by the relay station 103 in the station recording medium 307. Also, when data is to be transmitted from the relay station 103, the station recording controller 308 loads the data recorded in the station recording medium 307, and outputs that data to the communication controller 306 or a station close proximity communication controller 311 (to be described later).

The first and second close proximity communication units 309 and 310 are interfaces for close proximity wireless communications, and can establish close proximity wireless communication connections with close proximity communication apparatuses when such apparatuses are detected within a communication range. In this embodiment, when the digital camera 101 is brought closer to the relay station 103, the first close proximity communication unit 309 makes a close proximity wireless communication with the camera close proximity communication unit 209 of the digital camera 101. Also, when the digital video camera 102 is brought closer to the relay station 103, the second close proximity communication unit 310 makes a close proximity wireless communication with a close proximity communication unit (not shown) included in the digital video camera 102. The station close proximity communication controller 311 has a function of detecting a connection and disconnection of a close proximity wireless communication with a close proximity communication apparatus located within the communication range. When a connection with the close proximity communication apparatus located within the communication range is established or it is disconnected, the station close proximity communication controller 311 informs the station controller 301 of the establishing connection or disconnection event. The station close proximity communication controller 311 transmits data stored in the station memory 302 or station recording medium 307 to the close proximity communication apparatus located within the communication range via the first or second close proximity communication unit 309 or 310. Also, the station close proximity communication controller 311 stores data received from the close proximity communication apparatus located within the communication range via the first or close proximity communication unit 309 or 310 in the station memory 302 or station recording medium 307.

Note that the station controller 301 has a function of acquiring information of apparatuses connected in a close proximity wireless communication mode via the first and second close proximity communication units 309 and 310, and information of external apparatuses on the network 104 connected via the communication unit 305. The station controller 301 generates an external apparatus list based on the acquired apparatus information, and stores that list in the station memory 302. Assume that the external apparatus list is a list of external apparatuses on the network 104 and apparatuses connected in the close proximity wireless communication mode, and include all apparatuses with which the relay station 103 can establish communication connections. Note that the external apparatus list will be explained below as a list of external apparatuses on the network 104 and apparatuses connected in the close proximity wireless communication mode. However, the external apparatus list is not limited to such specific implementation. For example, when the relay station 103 is a recording apparatus such as an HDD having a network relay function, the external apparatus list, that is, the list of apparatuses with which the relay station 103 can establish communication connections, may include the communication relay apparatus itself (relay station 103) as the recording apparatus. In this case, in an upload process (to be described later), a data communication can be made between the digital camera 101 and relay station 103.

FIG. 4 shows an example of the external apparatus list generated by the relay station 103 in the system configuration of this embodiment.

The external apparatus list includes "apparatus name" as information of a name of an external apparatus, "I/F" as information of an interface via which the relay station 103 is connected to the external apparatus and "unique ID" as information required to discriminate the external apparatus. Also, the external apparatus list includes "executable application" indicating details of services (processes) that the external apparatus can execute. The executable application information is that of a function such as "printing" in case of, for example, the printer 108, which can be executed by the external apparatus via a data communication.

Note that the relay station 103 is compliant with the DLNA standard, as described above, and automatically detects the server 105, PC 106, DTV 107, and printer 108 connected to the network 104 to automatically acquire respective pieces of information in the aforementioned external apparatus list. Also, the following description will be given under the assumption that the relay station 103 can acquire respective pieces of information of the aforementioned external apparatus list from the external apparatuses connected in the close proximity wireless communication mode by the first and second close proximity communication units 309 and 310.

(Upload Process)

The upload process of image data in the digital camera and relay station of this embodiment having the aforementioned arrangements will be described below with reference to the sequence flowchart shown in FIG. 5. This upload process will exemplify a case in which image data of the digital camera 101 is uploaded to the server 105 via the relay station 103. Note that this sequence flowchart shows the overall sequence of the upload process, and the detailed processes in the digital camera 101 and relay station 103 will be explained later in upload processes on the terminal and relay sides.

Figure 6A:
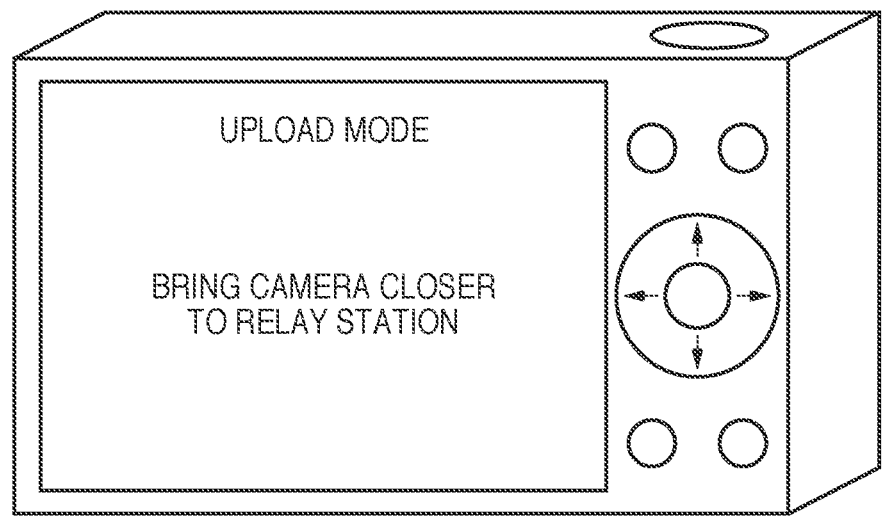
FIGS. 6A and 6B are views showing GUI display examples in the upload process.

In step S501, the user operates the digital camera 101 to select image data as upload process targets. At this time, the user operates the operation unit 203 while browsing, for example, an image data selection screen displayed on the display unit 205, and selects image data to be uploaded. Upon completion of selection of the image data, the digital camera 101 displays, on the display unit 205, a GUI that prompts the user to set a state that allows to establish a close proximity wireless communication connection with the external apparatus which makes a close proximity wireless communication (that is, to bring the camera closer to the relay station), as shown in, for example, FIG. 6A.

In step S502, the user places the digital camera 101 on (brings it closer to) the relay station 103. Assume that the user places the digital camera 101 so that the camera close proximity communication unit 209 and the first close proximity communication unit 309 in the relay station fall within a communication connection range of a close proximity wireless communication to be close to each other.

In step S503, the camera close proximity communication unit 209 of the digital camera 101 and the first close proximity communication unit 309 of the relay station 103 establish a connection in the close proximity wireless communication mode.

In step S504, an authentication process for exchanging each other's unique ID information of the apparatuses is executed between the digital camera 101 and relay station 103, which have established the close proximity wireless communication connection.

In step S505, the relay station 103 recognizes the first connection with the digital camera 101, and transmits the external apparatus list to the digital camera 101.

In step S506, upon completion of transmission of the external apparatus list, the relay station 103 outputs audio data required to notify the user of completion of transmission of the external apparatus list using the audio output unit 303.

In step S507, the user separates the digital camera 101 to fall outside the communication connection range of the close proximity wireless communication.

In step S508, the camera close proximity communication unit 209 of the digital camera 101 and the first close proximity communication unit 309 of the relay station 103 disconnect the close proximity wireless communication connection.

Figure 6B:
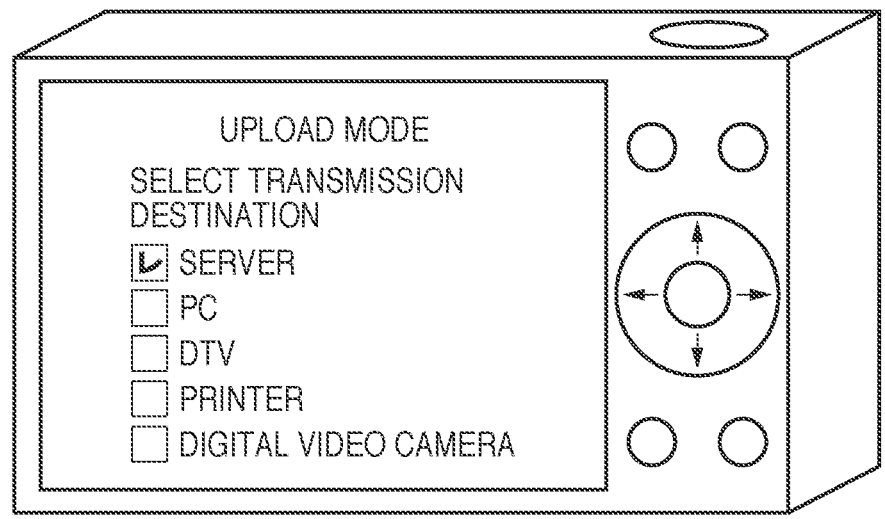

In step S509, the user operates the digital camera 101 to select an external apparatus to which the image data are to be uploaded. At this time, the user operates the operation unit 203 while browsing a GUI which is displayed on, for example, the display unit 205, as shown in FIG. 6B, and prompts the user to select an external apparatus as a transmission destination based on the external apparatus list acquired in step S505, and selects the external apparatus as the transmission destination (target designation). Upon completion of selection of the external apparatus as the transmission destination, the digital camera 101 displays again, on the display unit 205, the GUI which prompts the user to set the state that allows to establish a close proximity wireless communication connection with the external apparatus which makes a close proximity wireless communication, as shown in, for example, FIG. 6A.

In step S510, the user places the digital camera 101 on (brings it closer to) the relay station 103 again. Assume that the user places the digital camera 101 so that the camera close proximity communication unit 209 and the first close proximity communication unit 309 in the relay station fall within a communication connection range of a close proximity wireless communication to be close to each other.

In step S511, the camera close proximity communication unit 209 of the digital camera 101 and the first close proximity communication unit 309 of the relay station 103 establish a close proximity wireless communication connection again.

In step S512, an authentication process for exchanging each other's unique ID information of the apparatuses is executed between the digital camera 101 and relay station 103, which have established the close proximity wireless communication connection.

In step S513, the relay station 103 recognizes the second (next) connection with the digital camera 101, and receives information of the external apparatus on the network as the transmission destination selected in step S509 from the digital camera 101 (target reception). The relay station 103 receives information that requests an upload process from the digital camera 101 together with the information of the external apparatus on the network as the transmission destination. In this upload process, the relay station 103 receives, from the digital camera 101, information that specifies the server 105 as the information of the external apparatus on the network as the transmission destination. Also, the relay station 103 receives information associated with the image data to be uploaded selected in step S501 from the digital camera 101. The information associated with the image data includes, for example, the number of files, file names, and file sizes of the image data to be uploaded.

In step S514, the digital camera 101 transmits the image data to be uploaded selected in step S501 to the relay station 103.

In step S515, the relay station 103 establishes a communication connection between itself and the server 105 based on the information of the external apparatus on the network as the transmission destination, which is received in step S513. Then, the relay station 103 transfers all the image data to be uploaded received in step S514 to the server 105.

In step S516, upon completion of uploading of all the image data, the relay station 103 outputs audio data required to notify the user of completion of uploading of all the image data using the audio output unit 303.

In step S517, the user separates the digital camera 101 to fall outside the communication connection range of the close proximity wireless communication.

In step S518, the camera close proximity communication unit 209 of the digital camera 101 and the first close proximity communication unit 309 of the relay station 103 disconnect the close proximity wireless communication connection, thus completing the upload process.

In this way, the user can transfer image data stored in the digital camera 101 to the server 105 on the network via the relay station 103 using a close proximity wireless communication. Note that this upload process has exemplified the server 105 as the external apparatus on the network as the transmission destination. However, when the user selects the external apparatus such as the DTV 107 or printer 108, which does not include any upload process in the executable application information, in step S509, the digital camera 101 can process as follows. For example, the digital camera 101 may display, on the display unit 205, a GUI that gives a warning indicating that it is impossible to execute the upload process. In steps S506 and S516, the relay station notifies the user of completion of data transmission in the close proximity wireless communication by outputting audio data from its audio output unit 303. However, the implementation of the present invention is not limited to this. For example, when the digital camera 101 can output audio data, it may output audio data. Also, in place of notification to the user using audio data, for example, the display unit 205 of the digital camera 101 may display a GUI indicating completion of data transmission in the close proximity wireless communication, thereby notifying the user of completion of data transmission.

(Upload Process on Terminal Side)

The upload process on the terminal side of image data in the digital camera of this embodiment will be further described below with reference to the flowchart shown in FIG. 7. Note that the following description will be given under the assumption that this upload process on the terminal side is started when the user selects, for example, a menu for executing an upload process of image data in the close proximity wireless communication mode by making an input to the operation unit 203.

In step S701, the camera controller 201 displays a list of image data recorded in, for example, the camera recording medium 207 on the display unit 205, and prompts the user to select images to be uploaded. More specifically, the camera controller 201 acquires information of images to be uploaded, which is obtained by judging inputs from the operation unit 203 by the operation controller 204, and stores the information in the camera memory 202. When the operation controller 204 determines completion of selection of images to be uploaded based on, for example, an input to the operation unit 203, the camera controller 201 advances the process to step S702.

In step S702, the camera controller 201 outputs, to the display controller 206, a GUI which is stored in the camera memory 202 and prompts the user to set a state that allows to establish a close proximity wireless communication connection with the external apparatus which makes a close proximity wireless communication, and controls the display controller 206 to display the GUI on the display unit 205. The camera controller 201 determines whether or not to receive information of an establishing connection event of a close proximity wireless communication from the camera close proximity communication controller 210. More specifically, when the user places the digital camera 101 on (brings it closer to) the first close proximity communication unit 309 of the relay station 103, a close proximity wireless communication is allowed. When the camera close proximity communication controller 210 determines that the close proximity wireless communication apparatus (relay station 103) is detected within a close proximity wireless communication range, it establishes a close proximity wireless communication connection. Then, the camera close proximity communication controller 210 informs the camera controller 201 of the establishing connection event of the close proximity wireless communication. If the camera controller 201 receives information of the establishing connection event of the close proximity wireless communication from the camera close proximity communication controller 210, it advances the process to step S703. If the camera controller 201 does not receive any information of the establishing connection event of the close proximity wireless communication, it repeats the process in step S702.

In step S703, the camera controller 201 transmits unique ID information of the digital camera 101, which is stored in the camera memory 202, to the camera close proximity communication controller 210. Then, the camera controller 201 controls the camera close proximity communication controller 210 to transmit the unique ID information of the digital camera 101 to the first close proximity communication unit 309 of the relay station 103, with which the close proximity wireless communication connection has established, via the camera close proximity communication unit 209. Also, when the camera close proximity communication controller 210 receives unique ID information of the relay station 103 from the relay station 103 via the camera close proximity communication unit 209, the camera controller 201 executes the following process. The camera controller 201 stores the unique ID information of the relay station 103 in the camera memory 202 as information of a relay apparatus of the upload process. In this way, the camera controller 201 authenticates the relay station 103 as the relay apparatus of the upload process.

In step S704, if the camera close proximity communication controller 210 receives the external apparatus list from the relay station 103 via the camera close proximity communication unit 209, it informs the camera controller 201 of reception of the list. The camera controller 201 controls the camera close proximity communication controller 210 to store the external apparatus list received from the relay station 103 in the camera memory 202 as an apparatus list of transmission destinations of the upload process.

The camera controller 201 determines in step S705 whether or not to receive information of a disconnection event of the close proximity wireless communication from the camera close proximity communication controller 210. More specifically, when the user removes (separates) the digital camera 101 to fall outside the close proximity wireless communication range of the relay station 103, the camera close proximity communication controller 210 determines that the close proximity wireless communication connection is disconnected. Then, the camera close proximity communication controller 210 informs the camera controller 201 of the disconnection event of the close proximity wireless communication. If the camera controller 201 does not receive any information of the disconnection event of the close proximity wireless communication, it repeats the process in step S705; otherwise, it advances the process to step S706.

In step S706, the camera controller 201 displays a list of connectable external apparatuses via the relay station 103 on the display unit 205, and prompts the user to select an external apparatus as a transmission destination. More specifically, the camera controller 201 outputs the information of the apparatus list of transmission destinations of the upload process, which is stored in the camera memory 202, to the display controller 206, and controls the display controller 206 to generate display data of a list of connectable external apparatuses. The display controller 206 then outputs the display data of the list of connectable external apparatuses to the display unit 205 according to an instruction from the camera controller 201.

The camera controller 201 determines in step S707 if the user makes a selection input of an external apparatus as a transmission destination of the upload process to the operation unit 203. If an external apparatus is selected as the transmission destination of the upload process, the camera controller 201 stores information of the selected external apparatus in the camera memory 202 as that of the external apparatus as the transmission destination of the upload process, and advances the process to step S708. If no external apparatus is selected as the transmission destination of the upload process, the camera controller 201 repeats the process in step S707. On the other hand, if the external apparatus selected as the transmission destination of the upload process is an apparatus which cannot execute the upload process, the camera controller 201 may display, on the display unit 205, a GUI that gives a warning indicating that the selected apparatus is incompatible to the upload process, and may return the process to step S706.

In step S708, the camera controller 201 outputs, to the display controller 206, a GUI which is stored in the camera memory 202 and prompts the user to set a state that allows to establish a close proximity wireless communication connection again with the external apparatus which makes a close proximity wireless communication, and controls the display controller 206 to output the GUI on the display unit 205.

The camera controller 201 determines in step S709 whether or not to receive information of a establishing re-connection event of the close proximity wireless communication from the close proximity communication controller 210. More specifically, when the camera closes proximity communication controller 210 determines that the close proximity wireless communication apparatus (relay station 103) is detected within a close proximity wireless communication range, it establishes a close proximity wireless communication connection. Then, the camera close proximity communication controller 210 informs the camera controller 201 of the establishing connection event of the close proximity wireless communication. If the camera controller 201 receives information of the establishing connection event of the close proximity wireless communication from the camera close proximity communication controller 210, it advances the process to step S710. If the camera controller 201 does not receive any information of the establishing connection event of the close proximity wireless communication, it repeats the process in step S709.

In step S710, the camera controller 201 exchanges unique IDs with the external apparatus with which the close proximity wireless communication connection has been established, as in step S703. At this time, if the unique ID of the external apparatus connected in the close proximity wireless communication mode is the same as the information of the relay apparatus (relay station 103) of the upload process, which is stored in the camera memory 202, the camera controller 201 advances the process to step S711. On the other hand, if the unique ID of the external apparatus connected in the close proximity wireless communication mode is different from the information of the relay apparatus of the upload process, which is stored in the camera memory 202, the camera controller 201 may return the process to step S708 or may forcibly terminate the upload process on the terminal side.

In step S711, the camera controller 201 outputs the information of the external apparatus as the transmission destination of the upload process and that of the images to be uploaded, which are stored in the camera memory 202, to the camera close proximity communication controller 210. Then, the camera controller 201 requests the camera close proximity communication controller 210 to execute a process for uploading the information of the external apparatus as the transmission destination of the upload process and that of the images to be uploaded, and transmits these pieces of information to the relay station 103 via the camera close proximity communication unit 209.

In step S712, the camera controller 201 sequentially outputs image data to be uploaded, which are recorded in the camera recording medium 207, to the camera close proximity communication controller 210 based on the information of the images to be uploaded, and controls the camera close proximity communication controller 210 to transmit them from the camera close proximity communication unit 209. Note that when the digital camera 101 is re-connected in the close proximity wireless communication mode, if the external apparatus as the transmission destination of the upload process and the relay station 103 cannot be connected, the camera controller 201 receives information indicating that it is impossible to upload any data from the relay station 103. In this case, the camera controller 201 may output, to the display unit 205, a GUI which prompts the user to confirm the external apparatus as the transmission destination of the upload process, and may terminate the upload process on the terminal side without uploading any image data.

(Upload Process on Relay Side)

Figure 8:
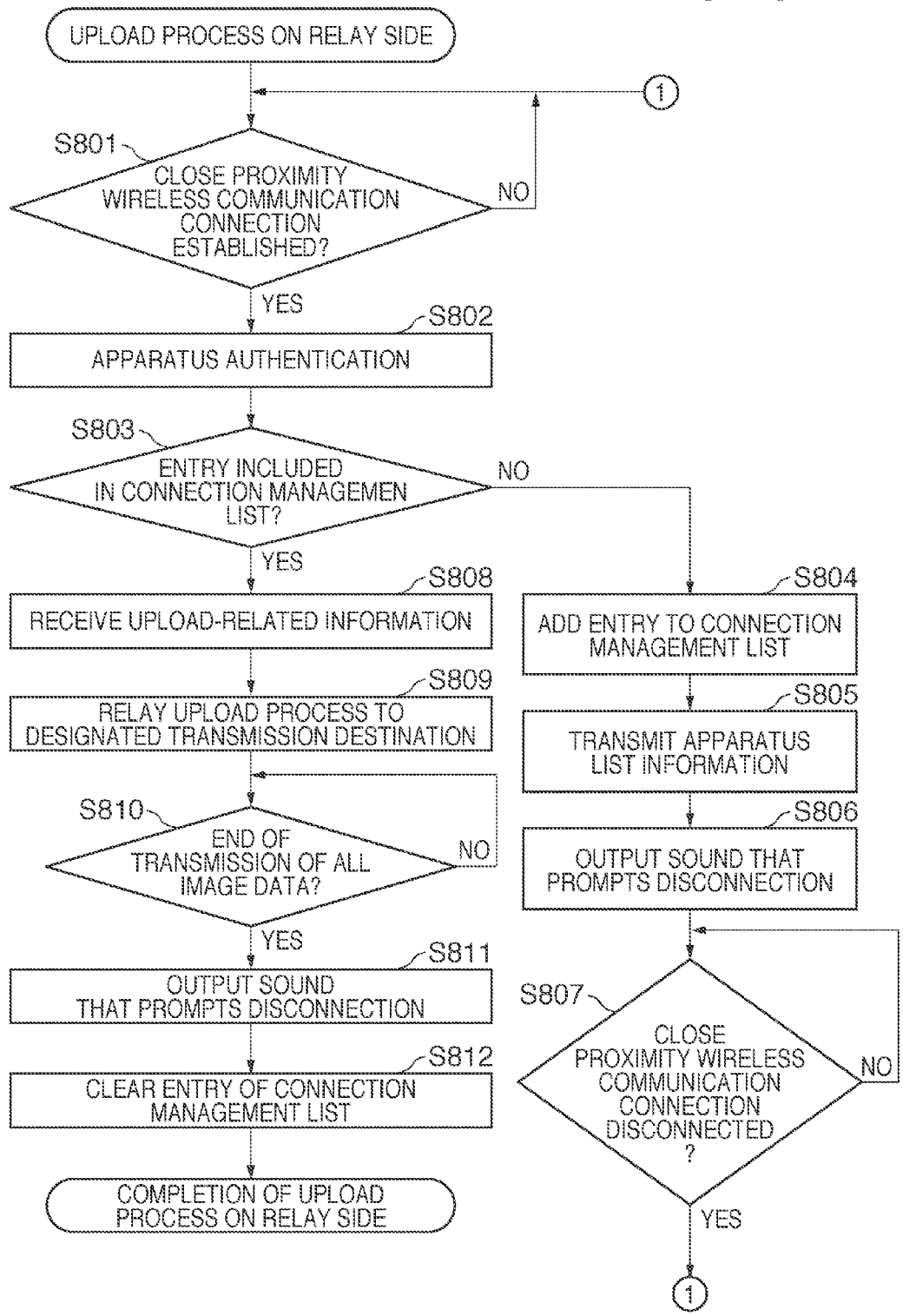
FIG. 8 is a flowchart for explaining an upload process on the relay side according to the embodiment.

The upload process on the relay side of image data in the relay station of this embodiment will be further described below with reference to the flowchart shown in FIG. 8.

After the power supply of the relay station 103 is turned on, and a predetermined process required at the startup timing is completed, the station controller 301 starts an upload process on the terminal side, and repeats the process in step S801 until a close proximity wireless communication connection is established. More specifically, the station controller 301 waits for the process until the user makes an operation to upload image data at the digital camera 101 and brings the digital camera 101 closer to the relay station 103 in a close proximity wireless communication state. That is, the station controller 301 determines whether or not to receive information of an establishing connection event of the close proximity wireless communication from the station close proximity communication controller 311. When the station close proximity communication controller 311 determines that the close proximity wireless communication apparatus (digital camera 101) is detected within the close proximity wireless communication range, it establishes a close proximity wireless communication connection via the first or second close proximity communication unit 309 or 310. Then, the station close proximity communication controller 311 informs the station controller 301 of the establishing connection event of the close proximity wireless communication. If the station controller 301 receives information of the establishing connection event of the close proximity wireless communication from the station close proximity communication controller 311, it advances the process to step S802. Note that this embodiment will give the following description under the assumption that the camera closes proximity communication unit 209 of the digital camera 101 and the first close proximity communication unit 309 of the relay station 103 make a close proximity wireless communication.

In step S802, the station controller 301 transmits unique ID information of the relay station 103, which is stored in the station memory 302, to the station close proximity communication controller 311. Then, the station controller 301 controls the station close proximity communication controller 311 to transmit the unique ID information of the relay station 103 to the camera close proximity communication unit 209 of the digital camera 101, with which the close proximity wireless communication connection has been established, via the first close proximity communication unit 309. Also, the station controller 301 controls the station close proximity communication controller 311 to receive unique ID information of the digital camera 101 from the digital camera 101 via the first close proximity communication unit 309. Then, the station controller 301 determines whether or not the received unique ID information of the digital camera 101 is registered in a connection management list, which is stored in the station memory 302 (S803).

The connection management list manages pieces of unique ID information of apparatuses with which close proximity wireless communication connections have been established in the first and second close proximity communication units 309 and 310 of the relay station 103. The connection management list can manage, for example, up to two types of unique IDs of apparatuses, the close proximity wireless communication connections of which have been established with the relay station 103, and can cope with a case in which the first and second close proximity communication units 309 and 310 simultaneously establish the close proximity wireless communication connections. By managing the unique ID information of the apparatus with which the close proximity wireless communication connection has been established using the connection management list, the station controller 301 can determine whether or not the external apparatus list is required to be transmitted to the connection-established apparatus.

If it is determined in step S803 that the received unique ID information of the digital camera 101 is not registered in the connection management list stored in the station memory 302, the station controller 301 advances the process to step S804. That is, if it is determined the digital camera 101 is connected to the relay station 103 in the close proximity wireless communication mode for the first time since the upload process has been started, the station controller 301 executes the following processes in steps S804 to S807.

In step S804, the station controller 301 adds the unique ID information of the digital camera 101 received in step S802 to the connection management list stored in the station memory 302. At this time, for example, when the connection management list has already stored two pieces of unique ID information other than that of the digital camera 101, the station controller 301 may delete the unique ID information having an older connection time of these pieces of information, and may add the unique ID of the digital camera 101. The unique ID which remains stored in the connection management list is information of an apparatus, a close proximity wireless communication connection of which has been established with the relay station 103 before the digital camera 101, and is handled in a manner that the external apparatus list was transmitted, but the upload process has not been executed. Note that when the connection management list is allowed to manage two or more types of unique IDs of apparatuses with which close proximity wireless communication connections have been established, these unique IDs may be managed together with information indicating the processing statuses of the connection-established apparatuses such as "completion of image selection" and "completion of upload apparatus selection". This configuration can cope with a case in which, for example, the digital camera 101 interrupts the upload process after it receives the external apparatus list, and starts a new upload process again. That is, even when the connection management list stores the unique ID of the digital camera 101, since the digital camera 101 is connected again to have a status "completion of image selection", it can be determined that the digital camera 101 is connected to the relay station 103 for the first time since the upload process has been started. That is, in step S803 the station controller 301 needs only determine the first connection of the apparatus which is connected to the relay station 103 in the close proximity wireless communication mode since the process for data transfer has been started, and the specification of the connection management list is not limited to that of this embodiment.

In step S805, the station controller 301 controls the communication controller 306 and station close proximity communication controller 311 to acquire information of external apparatuses connected to the relay station 103 using the automatic detection function and automatic capability acquisition function of the relay station 103. Then, the station controller 301 stores the obtained information of the external apparatuses as the external apparatus list in the station memory 302. Also, the station controller 301 transfers the external apparatus list to the station close proximity communication controller 311, and control it to transmit the list to the digital camera 101 via the first close proximity communication unit 309.

Upon completion of transmission of the external apparatus list, the station controller 301 transfers audio data required to notify the user of completion of the transmission of the external apparatus list, which is stored in the station memory 302, to the audio output controller 304 in step S806. Then, the station controller 301 controls the audio output controller 304 to output the audio data required to notify the user of completion of the transmission of the external apparatus list via the audio output unit 303.

After completion of the transmission of the external apparatus list and audible notification to the user, the station controller 301 determines whether or not to receive information of a disconnection event of the close proximity wireless communication (S807). More specifically, when the station close proximity communication controller 311 determines that the close proximity communication apparatus (digital camera 101) is removed to fall outside the close proximity wireless communication range of the first close proximity communication unit 309, it determines that the connection of the close proximity wireless communication is disconnected. Then, the station close proximity communication controller 311 informs the station controller 301 of the disconnection event of the close proximity wireless communication. The station controller 301 repeats the process in step S807 until it receives the information of the disconnection event of the close proximity wireless communication. If the information of the disconnection event of the close proximity wireless communication is received, the station controller 301 returns the process to step S801.

If it is determined in step S803 that the received unique ID information of the digital camera 101 is registered in the connection management list stored in the station memory 302, the station controller 301 advances the process to step S808. That is, when the digital camera 101 has started the upload process, and has acquired the external apparatus list via the first close proximity wireless communication connection, and it is determined that the digital camera 101 is connected again to the relay station 103 in the close proximity wireless communication mode, the station controller 301 advances the process to step S808.

In step S808, the station close proximity communication controller 311 receives upload-related information from the digital camera 101 as the external apparatus connected in the close proximity wireless communication mode via the first close proximity communication unit 309. The upload-related information includes information of the external apparatus as the transmission destination of the upload process, information indicating the sizes and the number of files of images to be uploaded, and an upload process request. The station close proximity communication controller 311 informs the station controller 301 of the acquisition of the upload-related information, and stores the upload-related information in the station memory 302.

In step S809, the station controller 301 acquires the information of the external apparatus as the transmission destination of the upload process from the upload-related information stored in the station memory 302, and establishes a communication path with that external apparatus. That is, the station controller 301 relays data transmission so as to transmit data input from the first close proximity communication unit 309 via the close proximity wireless communication to the external apparatus as the transmission destination of the upload process. For example, when the external apparatus as the transmission destination of the upload process is the server 105, the station controller 301 establishes a network connection with the server 105 to assure a communication path for the upload process. More specifically, the station controller 301 controls the communication controller 306 to establish a communication path required to make a one-to-one communication such as a peer-to-peer communication with the server 105 on the network via the communication unit 305. Then, the station controller 301 relays and transmits the image data to be uploaded, which are received by the first close proximity communication unit 309 in the close proximity wireless communication mode, to the server 105 using the established communication path via the communication unit 305.

Also, the station controller 301 acquires the total data size of the image data to be uploaded from the sizes and the number of files of the images to be uploaded in the upload-related information stored in the station memory 302. Then, the station controller 301 determines with reference to the data size transferred by the relayed upload process whether or not the upload process is complete (S810). More specifically, when the data size transferred by the relayed upload process becomes equal to the total data size of the image data to be uploaded, the station controller 301 determines that the upload process is complete. Note that the data size transferred by the relayed upload process can be acquired as, for example, the total size of data output from the communication unit 305. Upon completion of the upload process, the station controller 301 advances the process to step S811.

In step S811, the station controller 301 transfers audio data, which is stored in the station memory 302 and is required to notify the user of completion of the upload process of the image data, to the audio output controller 304. Then, the station controller 301 controls the audio output controller 304 to output the audio data required to notify the user of completion of the upload process of the image data via the audio output unit 303.

In step S812, the station controller 301 deletes the unique ID information added to the connection management list in step S804, that is, the unique ID of the digital camera 101 from the connection management list stored in the station memory 302, since the upload process is complete.

As described above, the communication apparatus and communication relay apparatus of the present invention can make a data communication in the close proximity wireless communication mode. The communication relay apparatus relays data received from the communication apparatus, and can transfer that data to an external apparatus connected to itself in a wired or wireless communication mode. More specifically, after the communication apparatus decides data to be transmitted via a data communication, when it is detected that the communication apparatus is connected to the communication relay apparatus for the first time in the close proximity wireless communication mode, they exchange information required to specify each other's apparatuses. The communication relay apparatus transmits a list of external apparatuses connected to itself to the communication apparatus, and closes the first close proximity wireless communication.

Then, after the user designates one data communication apparatus from the list of external apparatuses in the communication apparatus, when the communication apparatus and communication relay apparatus are connected again in the close proximity wireless communication mode, the communication relay apparatus establishes a communication path between the communication apparatus and the data communication external apparatus. More specifically, when information required to specify the communication apparatus connected in the close proximity wireless communication mode is the same as that required to specify the apparatus connected in the first close proximity wireless communication, the communication relay apparatus acquires information of the data communication external apparatus from the communication apparatus. Then, the communication relay apparatus establishes a communication path used to make a one-to-one data communication between the data communication external apparatus and the communication apparatus, relays data transmitted from the communication apparatus, and transfers the data to the data communication external apparatus using the established communication path.

In this way, even when a plurality of external apparatuses are connected to the communication relay apparatus, one of the connected external apparatuses is selected by connecting the communication apparatus to the communication relay apparatus in the close proximity wireless communication mode, and a data communication can be made from the communication apparatus.

(Modification)

The aforementioned embodiment has exemplified the case in which one of all the external apparatuses connected to the relay station is selected, and the upload process from the digital camera is executed. This modification will explain a method of transmitting the external apparatus list by limiting process executable external apparatuses according to a process executed at the digital camera when the relay station transmits the external apparatus list.

(Print Process)

A print process of image data in the digital camera and relay station of this modification, which have the same arrangements as in the aforementioned embodiment, will be described below with reference to the sequence flowchart shown in FIG. 9. Note that this sequence flowchart shows the overall sequence of the print process, and the detailed processes in the digital camera 101 and relay station 103 will be explained later in print data communication processes on the terminal and relay sides. Also, in the following description of the sequence flowchart, the same step numbers denote the sequence steps that execute the same processes as those in the sequence flowchart of the upload process of the aforementioned embodiment, and a description thereof will be omitted.

Figure 10A:
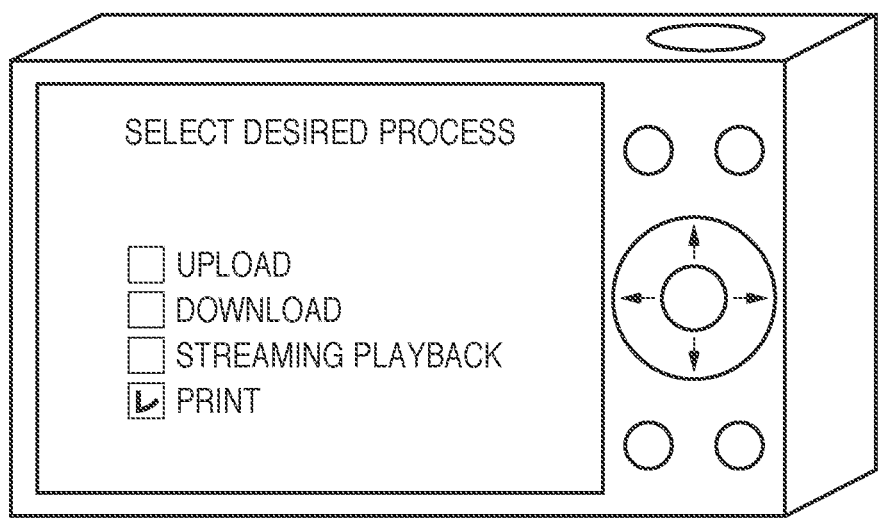
FIGS. 10A and 10B are views showing GUI display examples in the print process.

In step S901, the user selects image data as data communication targets by operating the digital camera 101. At this time, the user selects image data to be transmitted via a data communication by operating the operation unit 203 while browsing, for example, an image data selection screen displayed on the display unit 205. Upon completion of selection of image data, the digital camera 101 further displays, on the display unit 205, a GUI that prompts the user to select a desired process in the data communication, as shown in, for example, FIG. 10A. That is, the digital camera 101 prompts the user to select the process to be applied to the selected image data transmitted via the data communication by an apparatus as a transmission destination. This modification will explain a communication process executed when data recorded in the digital camera 101 is transmitted to the printer 108, and the printer 108 is controlled to print the data. After the user selects the desired process, the digital camera 101 displays, on the display unit 205, a GUI which prompts the user to set a state that allows to establish a close proximity wireless communication connection with an external apparatus which makes a close proximity wireless communication (to bring the digital camera 101 close to that apparatus).

After the digital camera 101 and relay station 103 exchange each other's unique ID information in the close proximity wireless communication mode in step S504, the relay station 103 recognizes the first connection with the digital camera 101. In step S902, the digital camera 101 transmits information of the desired process (print process) in the data communication to the relay station 103. That is, the relay station 103 receives the information of the desired process (print process) in the data communication.

In step S903, the relay station 103 extracts information of external apparatuses that can execute the desired process as executable application information of the external apparatus list, and transmits that list to the digital camera 101. In the system configuration of this embodiment, since the external apparatus that can execute the print process is only the printer 108, the extracted external apparatus list to be transmitted to the digital camera 101 includes only information of the printer 108.

Figure 10B:
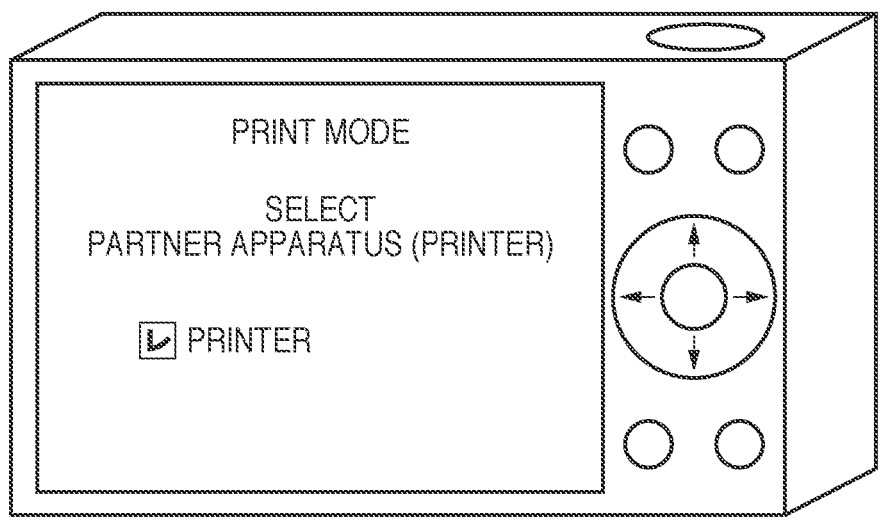

In step S904, the user selects an external apparatus which prints the image data by operating the digital camera 101. At this time, the user selects the external apparatus as the transmission destination by operating the operation unit 203 while browsing a GUI which is displayed on the display unit 205, as shown in FIG. 10B, and prompts the user to select the external apparatus as the transmission destination based on the extracted external apparatus list acquired in step S903. Upon completion of selection of the external apparatus as the transmission destination, the digital camera 101 displays again, on the display unit 205, the GUI which prompts the user to set the state that allows to establish a close proximity wireless communication connection with the external apparatus which makes a close proximity wireless communication, as shown in, for example, FIG. 6A.

In step S905, the relay station 103 recognizes the second (next) connection with the digital camera 101, and receives information of the external apparatus on the network as the transmission destination selected in step S904 and information that requests a print process from the digital camera 101. In this print process, the relay station 103 receives, from the digital camera 101, information that specifies the printer 108 as the information of the external apparatus on the network as the transmission destination. Also, the digital camera 101 transmits the image data as the data communication targets selected in step S501 and information related to the print process to the relay station 103. The information related to the print process includes, for example, information associated with print settings such as print paper sheets, and the numbers of files, file names, and file sizes of the image data to be printed. That is, in case of external apparatuses such as the server 105 and PC 106 which can execute file transfer, information related to a file transfer process is transmitted. Also, in case of external apparatus such as the PC 106 and DTV 107 which can execute streaming playback, information related to a streaming process is transmitted.

In step S906, the relay station 103 establishes a communication connection between itself and the printer 108 based on the information of the external apparatus on the network as the transmission destination, which is received in step S905. The relay station 103 transfers all the image data to be printed and the information related to the print process, which are received in step S905, to the printer 108, and control the printer 108 to execute the print process.

(Print Data Communication Process on Terminal Side)

Figure 11:
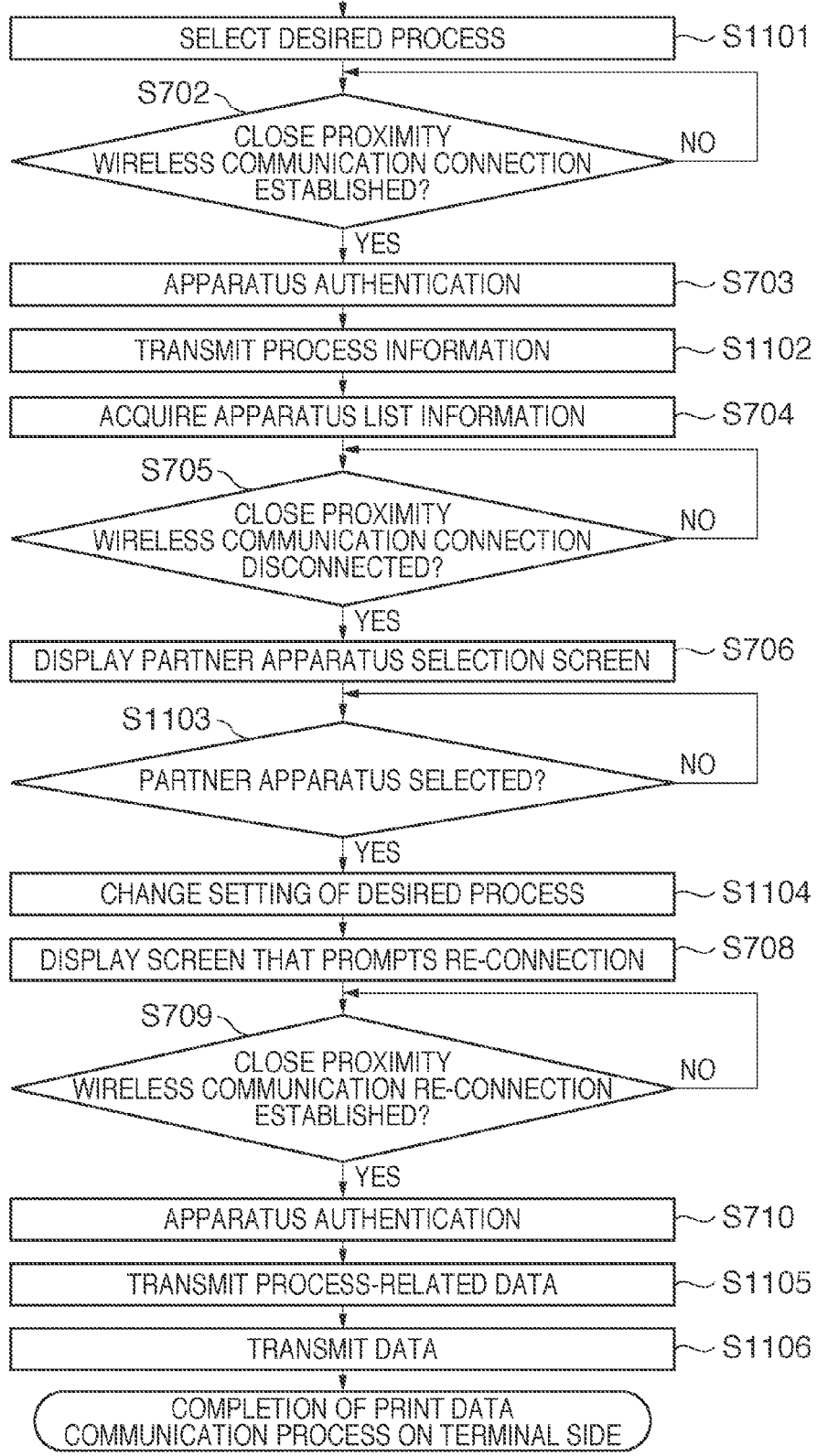
FIG. 11 is a flowchart for explaining a print data communication process on the terminal side according to the modification.

The print data communication process on the terminal side of image data in the digital camera of this modification will be further described below with reference to the flowchart shown in FIG. 11. Note that the following description will be given under the assumption that this print data communication process on the terminal side is started when image data to be transmitted via a data communication in the close proximity wireless communication mode are selected based on user inputs to the operation unit 203. Also, in this print data communication process on the terminal side, the same step numbers denote the steps that execute the same processes as in the upload process on the terminal side of the aforementioned embodiment, and a description thereof will not be repeated.

In step S1101, the camera controller 201 displays, on the display unit 205, a list of processes to be applied to the image data to be transmitted via a data communication by making the data communication, and prompts the user to select a desired process. More specifically, the camera controller 201 acquires information of the desired process (print process) to be executed via the data communication, which is obtained when the operation controller 204 determines the input to the operation unit 203, and stores it as designated process information in the camera memory 202. If the operation controller 204 determines based on, for example, the input to the operation unit 203 that the process to be executed via the data communication is decided, the camera controller 201 advances the process to step S702.

In step S1102, the camera controller 201 transfers the designated process information stored in the camera memory 202 in step S1101 to the camera close proximity communication controller 210, and controls the camera close proximity communication controller 210 to transmit that information to the relay station 103 via the camera close proximity communication unit 209.

In step S704, if the camera close proximity communication controller 210 receives the external apparatus list from the relay station 103 via the camera close proximity communication unit 209, it informs the camera controller 201 of reception of the list. The camera controller 201 controls the camera close proximity communication controller 210 to store the external apparatus list received from the relay station 103 in the camera memory 202 as an apparatus list of transmission destinations of the print process. Note that the external apparatus list received in step S704 is a list including only an external apparatus which has the print process as the designated process information in its executable application information. The camera close proximity communication controller 210 receives information of setting parameters of the print process of each external apparatus which is included in the external apparatus list and can execute the print process in addition to the external apparatus list, and similarly stores that information in the camera memory 202. The setting parameters of the print process include, for example, information of settable items such as an output paper type, output paper size, and color settings used when the external apparatus which can execute the print process executes the print process.

This modification will exemplify the case in which the print process is selected as the desired process. When other processes are selected, information related to each individual process such as information of setting parameters and limitations of that process is received in place of the aforementioned setting parameters of the print process. For example, when the desired process is an upload process, information related to an upper limit of a file size that can be uploaded according to the capacity of the storage area of the server 105 is received. For example, when the desired process is a download process, information of downloadable files is received.

The camera controller 201 determines in step S1103 whether or not the user makes an input to the operation unit 203 to select the external apparatus as the transmission destination of the print process. If the user selects the external apparatus as the transmission destination of the print process, the camera controller 201 stores information of the selected external apparatus in the camera memory 202 as that of the external apparatus as the transmission destination of the print process, and advances the process to step S1104. On the other hand, if the user does not select any external apparatus as the transmission destination of the print process, the camera controller 201 repeats the process in step S1103.

In step S1104, the camera controller 201 acquires information of the setting parameters of the print process of the selected external apparatus as the transmission destination of the print process from the camera memory 202, and displays a parameter setting GUI on the display unit 205 according to the setting parameters of the print process. The user can change and decide the settings of the print process by operating the operation unit 203 with reference to the parameter setting GUI displayed on the display unit 205 in this step. The camera controller 201 acquires the input detail of the operation unit 203 from the operation controller 204 to determine whether or not the user decides the settings of the print process, and stores the decided setting parameters of the print process in the camera memory 202. The camera controller 201 then advances the process to step S708.

In step S1105, the camera controller 201 outputs the information of the external apparatus as the transmission destination of the print process and the information of the images to be printed, which are stored in the camera memory 202, to the camera close proximity communication controller 210. Also, the camera controller 201 outputs the setting parameters of the print process stored in the camera memory 202 to the camera close proximity communication controller 210. Then, the camera controller 201 controls the camera close proximity communication controller 210 to transmit the information of the external apparatus as the transmission destination of the print process, the information of the images to be printed, and the setting parameters of the print process to the relay station 103 via the camera close proximity communication unit 209 together with a print process request.

In step S1106, the camera controller 201 sequentially outputs image data to be printed recorded in the camera recording medium 207 to the camera close proximity communication controller 210 based on the information of the images to be printed, and controls the camera close proximity communication controller 210 to transmit them via the camera close proximity communication unit 209. Note that when the digital camera 101 is re-connected in the close proximity wireless communication mode, if the external apparatus as the transmission destination of the print process and the relay station 103 cannot be connected, the camera controller 201 receives information indicating that the print process cannot be executed from the relay station 103. In this case, the camera controller 201 may output a GUI which prompts the user to confirm the external apparatus as the transmission destination of the print process on the display unit 205, and may terminate the print data communication process on the terminal side without transmitting any image data.

(Print Data Communication Process on Relay Side)

Figure 12:
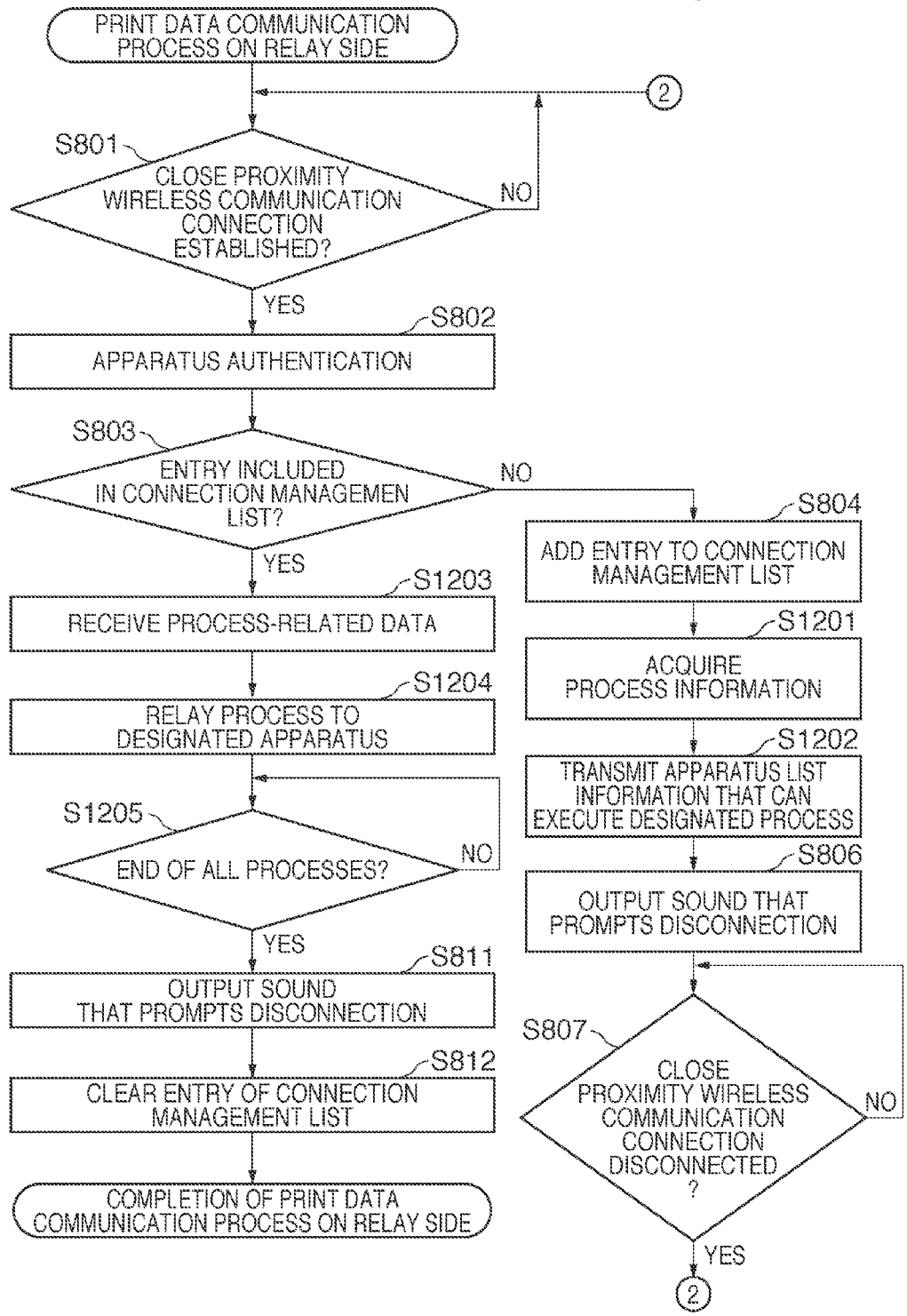
FIG. 12 is a flowchart for explaining a print data communication process on the relay side according to the modification.

The print data communication process on the relay side of image data in the relay station of this modification will be further described below with reference to the flowchart shown in FIG. 12. Note that the same step numbers in this print data communication process on the relay side denote the steps which execute the same processes as in the upload process on the relay side of the aforementioned embodiment, and a description thereof will be omitted.

When it is determined that the digital camera 101 is connected to the relay station 103 for the first time since it has started the print process, the station controller 301 receives the designated process information as the user's desired process from the digital camera 101 in step S1201. More specifically, the station close proximity communication controller 311 informs the station controller 301 of reception of the designated process information via the first close proximity communication unit 309. Then, the station controller 301 controls the station close proximity communication controller 311 to store information of the print process as the received designated process information in the station memory 302.

In step S1202, the station controller 301 controls the communication controller 306 and station close proximity communication controller 311 to acquire information of external apparatuses connected to the relay station 103 using the automatic detection function and automatic capability acquisition function of the relay station 103. The station controller 301 stores the obtained information of the external apparatuses in the station memory 302 as an external apparatus list. The station controller 301 extracts information of external apparatuses, which can execute the print process as the designated process information stored in the station memory 302 from the external apparatus list with reference to the executable application information, thus acquiring an external apparatus list for the print process. Then, the station controller 301 transfers the extracted external apparatus list for the print process to the station close proximity communication controller 311, and controls the station close proximity communication controller 311 to transmit that list to the digital camera 101 via the first close proximity communication unit 309. The station controller 301 acquires information of setting parameters of the print process from each of the extracted external apparatuses that can execute the print process, transfers that information to the station close proximity communication controller 311, and similarly controls the station close proximity communication controller 311 to transmit the information to the digital camera 101 via the first close proximity communication unit 309.

If it is determined in step S803 that the received unique ID information of the digital camera 101 is registered in the connection management list stored in the station memory 302, the station controller 301 advances the process to step S1203. In step S1203, the station close proximity communication controller 311 receives print-related information from the digital camera 101 as the external apparatus connected in the close proximity wireless communication mode via the first close proximity communication unit 309. The print-related information includes information of the external apparatus as the transmission destination of the print process, information indicating the sizes and the number of files of images to be printed, the setting parameters of the print process, and a print process request. The station close proximity communication controller 311 informs the station controller 301 of acquisition of the print-related information, and stores the print-related information in the station memory 302.

In step S1204, the station controller 301 acquires the information of the external apparatus as the transmission destination of the print process from the print-related information stored in the station memory 302, and establishes a communication path with that external apparatus. That is, the station controller 301 relays data transmission so as to transmit data input from the first close proximity communication unit 309 via the close proximity wireless communication to the external apparatus as the transmission destination of the print process. For example, when the external apparatus as the transmission destination of the print process is the printer 108, the station controller 301 establishes a network connection with the printer 108, and assures a communication path for the print process. The station controller 301 then relays and transmits the image data to be printed, which are received by the first close proximity communication unit 309 in the close proximity wireless communication mode, to the printer 108 using the established communication path via the communication unit 305.

Also, the station controller 301 acquires the total data size of the image data to be printed from the information indicating the sizes and the number of files of the images to be printed in the print-related information stored in the station memory 302. Then, the station controller 301 determines with reference to the data size transferred by the relayed print process whether or not the print process is complete (S1205). More specifically, the station controller 301 determines that the print process is complete when the data size transferred by the relayed print process becomes equal to the total data size of the image data to be printed. Note that the data size transferred by the relayed print process can be acquired as, for example, the total size of data output from the communication unit 305. Upon completion of the print process, the station controller 301 advances the process to step S811.

As described above, the communication apparatus and communication relay apparatus according to the present invention can make a data communication in the close proximity wireless communication mode. The communication relay apparatus can relay data received from the communication apparatus, and can transfer the received data to an external apparatus connected to the communication relay apparatus in a wired or wireless communication mode. More specifically, after data to be transmitted via a data communication and a process to be executed via the data communication are decided in the communication apparatus, when a first connection between the communication apparatus and communication relay apparatus in the close proximity wireless communication mode is detected, these apparatuses exchange information required to specify each other. The communication relay apparatus acquires information of the process to be executed via the data communication from the communication apparatus, and transmits a list of external apparatuses which can execute the process to be executed via the data communication of external apparatuses connected to itself to the communication apparatus, thus closing the first close proximity wireless communication.

After the user designates one data communication apparatus from the list of external apparatuses at the communication apparatus, when the communication apparatus and communication relay apparatus are connected again in the close proximity wireless communication mode, the communication relay apparatus establishes a communication path between the communication apparatus and the data communication external apparatus. More specifically, when the information required to specify the communication apparatus connected in the close proximity wireless communication mode is the same as that required to specify the apparatus connected in the first close proximity wireless communication, the communication relay apparatus acquires information of the data communication external apparatus from the communication apparatus. Then, the communication relay apparatus establishes a communication path used to make a one-to-one data communication between the data communication external apparatus and the communication apparatus. The communication relay apparatus relays data transmitted from the communication apparatus, and transfers that data to the data communication external apparatus using the established communication path.

In this way, even when a plurality of external apparatuses are connected to the communication relay apparatus, one of the connected external apparatuses is selected by connecting the communication apparatus to the communication relay apparatus in the close proximity wireless communication mode, and a data communication can be made from the communication apparatus. Also, by limiting external apparatuses which can execute the process to be executed via the data communication from those connected to the communication relay apparatus, even when a large number of external apparatuses are connected to the communication relay apparatus, the user can reliably designate an external apparatus which executes the desired process.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-264187, filed Nov. 19, 2009, which is hereby incorporated by reference herein in its entirety.

What is claimed is:

1. A communication apparatus which comprises a close proximity communication unit which makes a close proximity wireless communication with a communication relay apparatus, and makes a data communication with one of a plurality of external apparatuses connected to the communication relay apparatus using the close proximity communication unit via the communication relay apparatus, said communication apparatus comprising:
   a display unit;
   a detection unit which detects a connection with the communication relay apparatus by the close proximity communication unit;
   an acquisition unit which acquires a list of the external apparatuses from the communication relay apparatus;

a target designating unit which prompts a user to designate one external apparatus used to make the data communication from the list of the external apparatuses acquired by said acquisition unit; and a transmission unit which transmits at least information of the one external apparatus designated by said target designating unit to the communication relay apparatus, wherein said acquisition unit acquires the list of the external apparatuses on a first connection between the communication apparatus and the communication relay apparatus by the close proximity communication when said detection unit detects the first connection, and said display unit displays, upon a trigger of a detection of disconnecting of the first connection by said detection unit, the list acquired by said acquisition unit on the first connection;

said target designating unit prompts, upon a trigger of the detection of disconnecting of the first connection by said detection unit, the user to designate one external apparatus from the list displayed by said display unit;

said transmission unit transmits the information of the one external apparatus designated by the user via said target designating unit to the communication relay apparatus when said detection unit detects a second connection, which is a connection subsequent to the first connection, between the communication apparatus and the communication relay apparatus by the close proximity communication.

2. The apparatus according to claim 1, further comprising a process designating unit which prompts the user to designate a process to be executed via the data communication, wherein when said detection unit detects the first connection with the communication relay apparatus, said acquisition unit transmits a detail of the process designated by said process designating unit to the communication relay apparatus, and acquires the list of the external apparatuses corresponding to the designated process.

3. The apparatus according to claim 2, wherein the process to be executed via the data communication is one of a file transfer process, a streaming process, and a print process.

4. The apparatus according to claim 1, wherein the communication apparatus functions as a digital camera.

5. The apparatus according to claim 1, wherein the close proximity wireless communication between the communication apparatus and the communication relay apparatus is established in response to the distance between the communication apparatus and the communication relay apparatus being within a predetermined range.

6. The apparatus according to claim 1, wherein any user operation is not needed until said display unit displays the list of the external apparatuses after the detection of disconnecting of the first connection.

7. A control method of a communication apparatus which comprises a close proximity communication unit which makes a close proximity wireless communication with a communication relay apparatus, and makes a data communication with one of a plurality of external apparatuses connected to the communication relay apparatus using the close proximity communication unit via the communication relay apparatus, the method comprising:

a detecting step of detecting a connection with the communication relay apparatus by the close proximity communication unit;

an acquiring step of acquiring a list of the external apparatuses from the communication relay apparatus;

a target designating step of prompting a user to designate one external apparatus used to make the data communication from the list of the external apparatuses acquired in the acquiring step;

a transmitting step of transmitting at least information of the one external apparatus designated in the target designating step to the communication relay apparatus, wherein in the acquiring step, the list of the external apparatuses is acquired on a first connection between the communication apparatus and the communication relay apparatus by the close proximity communication when the first connection between the communication apparatus and the communication relay apparatus by the close proximity communication unit is detected in the detecting step, the method further comprises a display step of displaying, upon a trigger of a detection of disconnecting of the first connection, the list acquired in the acquiring step on the first connection, in the target designating step, the user is prompted, upon a trigger of the detection of disconnecting of the first connection, to designate one external apparatus from the list displayed in the display step, and in the transmitting step, the information of the one external apparatus designated by the user in the target designating step is transmitted to the communication relay apparatus when a second connection, which is a connection subsequent to the first connection, between the communication apparatus and the communication relay apparatus by the close proximity communication unit is detected in the detection step.

8. The method according to claim 7, wherein any user operation is not needed until the list of the external apparatuses is displayed in the displaying step after the detection of disconnecting of the first connection.

* * * * *